Figure 1:
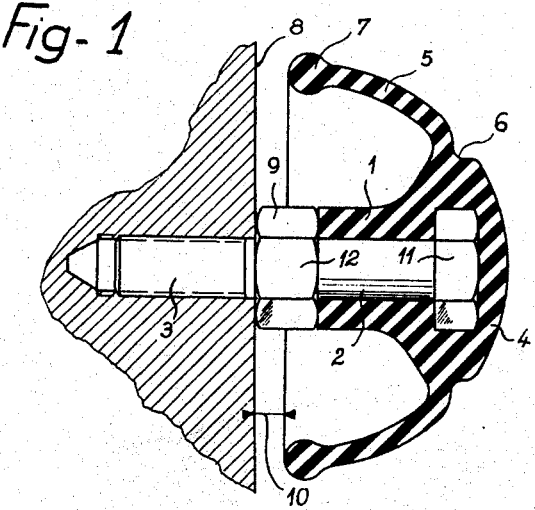

May 25, 1965  L. PÉRAS  3,185,427
TWO-POSITION SUPPORTING PEGS MADE OF FLEXIBLE
MATERIAL, MORE PARTICULARLY FOR USE
IN MOTOR VEHICLES
Filed March 16, 1964

Inventor
Lucien Peras
By Stevens, Davis, Miller & Mosher
Attorneys

United States Patent Office 3,185,427
Patented May 25, 1965

3,185,427
TWO-POSITION SUPPORTING PEGS MADE OF FLEXIBLE MATERIAL, MORE PARTICULARLY FOR USE IN MOTOR VEHICLES
Lucien Peras, Billancourt, France, assignor to Regie Nationale des Usines Renault, Billancourt, France
Filed Mar. 16, 1964, Ser. No. 352,073
Claims priority, application France, Mar. 22, 1963, 929,002, Patent 1,359,918
1 Claim. (Cl. 248—309)

This invention relates to a supporting peg made of a flexible and elastic material, which may be used with advantage in motor vehicles by virtue of its small size and the fact that it has no dangerous protruding parts.

A supporting peg according to the invention comprises a central stem portion into which is buried a screw for securing the peg to a wall, and a substantially hemispherical cap-like portion which is joined to a shoulder of said central stem and which may be turned either downwardly toward the wall whereby to serve as a coat-hanger support, or outwardly whereby to serve in addition as a coat-peg. Such a supporting peg can readily be manufactured by moulding and may easily be secured in position by means of a single screw.

The description which follows of one specific embodiment of the supporting peg of this invention, given with reference to the accompanying non-limitative exemplary drawing, will give a clear understanding of how the invention can be carried into practice.

Figure 2:
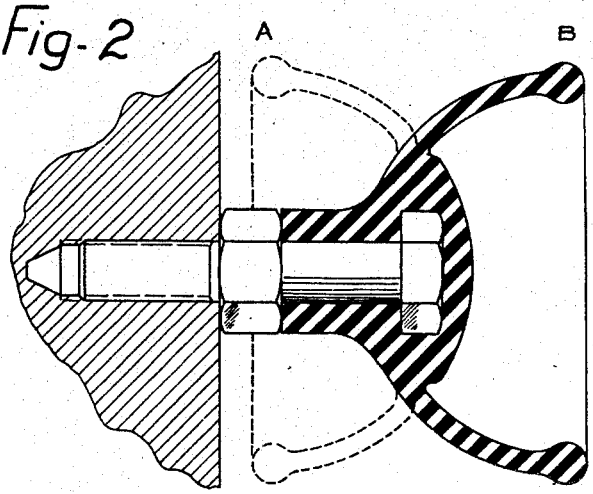

Referring to the drawing filed herewith:

FIGURE 1 shows in section a supporting peg according to the invention in its turned-down position for serving as a coat-hanger support; and FIGURE 2 is a sectional view of the same supporting peg in its outwardly turned position for serving as a coat-peg.

Reference to the accompanying drawing shows that said supporting peg consists basically of a central stem portion 1 made of flexible and elastic material into which is buried a metal stud 2 comprising a head 11, a hexagon-nut-like intermediate shoulder 9 and a threaded shank 3.

The end of stem 1 remote from shoulder 9 blends in with a thickened portion having a rounded outer surface 4 whose perimeter joins onto a substantially hemispherical cap 5.

A groove 6 imparts a certain degree of elasticity to said cap, enabling the same to be inverted, about this hinge-like groove, from position A to position B, as is clearly shown in FIGURE 2. A peripheral bead 7 contributes toward maintaining the cap 5 in shape.

The assembly hereinbefore described is screwed onto a wall 8 until the shoulder 9 butts thereagainst, such screwing operation being effected by using a spanner on the hexagon nut-like shoulder 9.

It is clearly apparent that, when the cap 5 is turned down, coat-hangers may be hooked into the gap 10, wherein they will be restrained by the resilience of the hemispherical cap 5 notwithstanding the jolting motion of the car.

When said cap is turned outwardly, a hat or a coat may be hung thereon, while the stem 1 remains available as an attachment point for a safety belt or for supporting an object equipped with a shoulder strap.

I claim:

A two-position supporting peg made of flexible material, more particularly for use in motor vehicles, comprising a central stem portion into which is buried a metal stud terminating in a screw portion for affixing the peg to a wall, and a substantially hemispherical cap which joins onto a shoulder portion integral with said central stud and which is adapted to be turned either inwardly toward the wall whereby to restrain a clothes-hanger supported on its central stem, or outwardly whereby to constitute a coat-peg.

References Cited by the Examiner
UNITED STATES PATENTS

| | | | |
|---|---|---|---|
| 2,111,456 | 3/38 | Markle | 65—12 |
| 2,588,631 | 3/52 | James | 72—105 |
| 2,663,530 | 12/53 | Nye | 248—206 |

FOREIGN PATENTS

| | | |
|---|---|---|
| 651,168 | 3/51 | Great Britain. |

CLAUDE A. LE ROY, *Primary Examiner.*